United States Patent [19]

Ogino et al.

[11] Patent Number: 4,628,977

[45] Date of Patent: Dec. 16, 1986

[54] HIGH-DURABLE PNEUMATIC RADIAL TIRES

[75] Inventors: Takao Ogino, Tokorozawa; Yoichi Watanabe, Kodaira; Shigehisa Sano, Akigawa, all of Japan

[73] Assignee: Bridgestone Corporation, Tokyo, Japan

[21] Appl. No.: 666,935

[22] Filed: Oct. 31, 1984

[30] Foreign Application Priority Data

Mar. 1, 1984 [JP] Japan .................................. 59-37230

[51] Int. Cl.$^4$ ............................ B60C 9/04; B60C 9/18
[52] U.S. Cl. .................................... 152/451; 152/527; 152/556; 148/12 B; 148/12.1; 420/9
[58] Field of Search ............... 152/451, 527, 540, 556; 156/124; 148/12 R, 12 B, 12.1, 36

[56] References Cited

U.S. PATENT DOCUMENTS

| | | | |
|---|---|---|---|
| 3,507,711 | 4/1970 | Fisher | 148/36 |
| 3,895,972 | 7/1975 | Woodilla et al. | 148/12.4 |
| 3,953,250 | 4/1976 | Golland et al. | 152/354 |
| 4,106,957 | 8/1978 | Tournoy | 152/356 R |
| 4,142,919 | 3/1979 | Maiffredy et al. | 148/12 B |
| 4,520,857 | 6/1985 | Ogino et al. | 152/536 |

FOREIGN PATENT DOCUMENTS

| | | |
|---|---|---|
| 519400 | 3/1980 | Australia . |
| 73546 | 5/1982 | Australia . |
| 1579586 | 7/1969 | France . |
| 0133804 | 10/1980 | Japan .................................. 148/12 B |
| 0001631 | 1/1984 | Japan .................................. 148/12 B |
| 1510328 | 5/1978 | United Kingdom . |
| 2081765 | 2/1982 | United Kingdom . |

OTHER PUBLICATIONS

294 Technische Mitteilungen Krupp. Forschungsbericht; Essen, Deutschland, vol. 39 (1981) Dec., No. 3, pp. 125-133.

*Primary Examiner*—Lois E. Boland
*Attorney, Agent, or Firm*—Sughrue, Mion, Zinn, Macpeak, and Seas

[57] ABSTRACT

A high-durable pneumatic radial tire is disclosed using steel cords in at least one of the carcass and the belt. This steel cord is produced by twisting plural steel filaments each having a tensile strength of not less than 220 kgf/mm$^2$, whose metallic structure being a fine pearlite structure having an average value of interlamellar distance between cementites of 300-500 Å and an average sectional area of single pearlite crystal grain in filament section of not more than 20 $\mu m^2$.

2 Claims, 2 Drawing Figures

HIGH-DURABLE PNEUMATIC RADIAL TIRES

BACKGROUND OF THE INVENTION

1. Field of the Invention

This invention relates to high-durable pneumatic radial tires, and more particularly to a pneumatic radial tire having considerably improved tire reinforcing properties by improving an internal structure of steel filament in steel cords as a tire reinforcement to thereby enhance the corrosion fatigue resistance of the steel filament itself.

2. Description of the Prior Art

When steel cords are used as a material for a carcass ply or a belt of a tire, various performance characteristics required for the tire deteriorate by a cord-breaking-up (CBU) failure mainly resulting from corrosion fatigue failure of the carcass, or by a corrosion of cords in the belt layers, particularly an outermost belt layer produced from cracks penetrating through a tread and a fatigue failure accompanied therewith, so that the use of steel cords comes into question in view of the tire durable life.

In this connection, the inventors have previously confirmed that the corrosion fatigue resistance of steel filaments used as a material for the steel cord can be improved by making an interlamellar distance between cementites in pearlite structure of the steel filament larger than the usual one of the prior art, which is disclosed in Japanese Patent Application No. 57-195,332.

Further, the inventors have examined with respect to the influence of grain size in pearlite crystals forming the pearlite structure and found out that the properties of the steel cord can considerably be improved by the particularization of the grain size of pearlite crystals.

In the steel cord, the progress of cracks based on the corrosion fatigue of the steel filament is governed by a stress state at an end portion of cementite inside the pearlite structure and a shearing stress state between cementite and ferrite. Although the average value of interlamellar distance between cementites in pearlite structure according to the prior art was usually 200–250 Å when it is increased to a range of 300–500 Å by optimizing a heat treatment before a final drawing at a production step of steel cords, the above mentioned stresses can be mitigated to make the growth and progress of cracks slow.

The cracks advance not only through the end portion of cementite in a pearlite crystal grain but also through the grain boundary in pearlite structure. In the latter case, it has been elucidated that the advance of cracks through pearlite crystal grains can be suppressed by making the grain boundary into a partition wall.

Namely, it is recognized that the fine division of pearlite crystal grain is required together with the increase of interlamellar distance.

SUMMARY OF THE INVENTION

Given the above situations, it is an object of the invention to further enhance the corrosion fatigue resistance of steel cords by improving the internal structure of steel filament constituting the steel cord to considerably increase a durable life of the radial tire using such steel cords as a tire reinforcement.

According to the invention, there is the provision of a highly-durable pneumatic radial tire comprising a tread portion, a pair of side portions extending from the tread portion, a pair of bead portions extending from the side portions, and a carcass reinforced with a belt embedded in the tread portion, in which steel cords are used in at least one of the carcass and the belt, characterized in that said steel cord is produced by twisting plural steel filaments each having a tensile strength of not less than 220 kgf/mm$^2$, whose metallic structure being a fine pearlite structure having an average value of interlamellar distance between cementites of 300–500 Å and an average sectional area of single pearlite crystal grain in filament section of not more than 20 $\mu$m$^2$.

In the preferred embodiment of the invention, the steel cords used in at least one of the carcass and the belt are covered with a coating rubber having a modulus at 50% elongation of 10–40 kgf/cm$^2$.

DETAILED DESCRIPTION OF THE INVENTION

Figure 1:
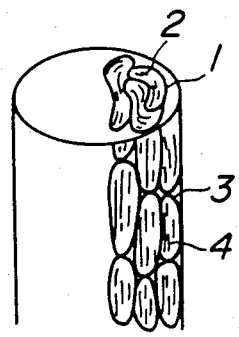
FIG. 1 is a diagrammatic view illustrating the internal structure in a main part of steel filament viewed from transverse and longitudinal directions.

In FIG. 1 is diagrammatically shown the internal structure of the steel filament constituting the steel cord in the transverse and longitudinal directions. First, pearlite crystal grains 1 generally referred to as a curled grain appear in the transverse direction of the steel filament, wherein a pearlite structure 2 comprising a lamellar aggregate of cementite and ferrite is observed in the pearlite crystal grain. On the other hand, a pearlite crystal grain 3 drawn by wire drawing and a pearlite structure 4 existent therein are observed in the longitudinal direction of the steel filament.

Figure 2:
FIG. 2 is a schematic view enlargedly illustrating the pearlite structure of the steel filament.

The pearlite structures 2, 4 are enlargedly shown in FIG. 2, wherein symbol A is a cementite lamella, symbol B a ferrite, symbol a a length of cementite, symbol c a distance between ends of opposite cementites, symbol e an end portion of cementite, and symbol $h_f$ an interlammelar distance between adjoining cementites.

The cracking due to corrosion fatigue advances through the end portion e of cementite in FIG. 2, which is considered to largely depend upon the stress state of the cementite end portion e. The stress of the cementite end portion e is represented by the following equation:

$$\sigma_{max} = (a/h_f) \cdot (1/c) \tag{1}$$

Therefore, the stress becomes higher as the cementite length a is long and the interlamellar distance $h_f$ and the cementite end distance c are narrow, which promotes the progress of the cracking due to corrosion fatigue.

Among factors serving to reduce the stress $\sigma_{max}$ of the cementite end portion e, the change of the cementite length a and the cementite end distance c is fairly difficult in view of the production conditions or the like. However, the interlamellar distance $h_f$ can be relatively easily changed, for example, by changing a patenting temperature at a step for the manufacture of steel cord.

In general, the interlamellar distance can be widened by raising the patenting temperature, whereby the stress $\sigma_{max}$ of the cementite end portion e in the equation (1) can be reduced effectively.

Moreover, the patenting temperature to be held at about 700° C. maximum when an austenitizing temperature prior to the patenting is 900°–1,200° C., because the uniform pearlite structure can not be obtained at the patenting temperature above 700° C.

The cracks growing in the crystal grain through the cementite end portion e advance when subjected to a resistance through the crystal grain boundary. Particularly, the size of the pearlite crystal grain or curled grain 1 is strongly related to the advancement of cracking in the transverse direction of FIG. 1. Therefore, as chances of meeting the crack produced from the surface of the steel filament with the crystal grain boundary until the breaking of the steel filament increases, i.e. as the pearlite crystal grains become finer, the advancement of cracking is easily suppressed. As a result the life of the steel filament causing the crack breaking can be prolonged. Moreover, the fine pearlite crystal grain is such that the concentration of hydrogen can be reduced by easily dispersing the absorbed hydrogen through the crystal grain boundary as regards hydrogen brittleness as a breaking factor under corrosion circumstances. Also, the fine pearlite structure improves the drawability of the material and exhibits excellent wire drawability.

In order to increase the interlamellar distance $h_f$ by the conventional manner, it is usually required to raise the patenting temperature in the heat treatment stage before the final wire drawing, which simultaneously makes the pearlite crystal grain coarse.

For instance, when the average interlamellar distance is increased from about 250 Å in the usually used crystal grain to about 350 Å, the size of the crystal grain becomes about two times.

On the contrary, it has been found that when the grain size of austenite remains fine by reducing a furnace temperature or by shortening a retention time in the solution heat treatment at the heat treatment stage, the pearlite crystal grain can be restrained small at the patenting temperature for widening the interlamellar distance, which makes possible to provide an adequate step for the obtention of metallic structure according to the invention. Namely, the pearlite crystal is transformed from the grain boundary of austenite in the patenting treatment, so that it is possible to make the pearlite crystal grain small by fining of austenite grain.

The reason why the interlamellar distance between cementites is limited to 300-500 Å on average by the optimization of the patenting temperature is due to the fact that when the interlamellar distance is less than 300 Å, the improvement of corrosion fatigue resistance is not sufficiently expected, while when the interlamellar distance exceeds 500 Å, the tensile strength greatly lowers and the use of steel filament as steel cord becomes not durable. Then, the reason why the average sectional area of single pearlite crystal grain in filament section is limited to not more than 20 $\mu m^2$ is due to the fact that when the grain size becomes larger, it is not sufficient to cause the effect of improving the corrosion fatigue resistance owing to the action as a partition wall against cracks advancing through a gap between the crystal grains. Moreover, the steel filament in itself should have a tensile strength of not less than 220 kgf/mm$^2$ because when the tensile strength is less than this value, the reinforcing performance required as the steel cord for tire is not attained.

The coating rubber embedding steel cords may be made of natural rubber and synthetic rubbers. When steel cords each composed of steel filaments having specified metallic structure and tensile strength are used in at least one of the carcass and the belt for radial tires, the coating rubber is preferable to have a modulus at 50% elongation of 10-40 kgf/cm$^2$. Because, when the modulus at 50% elongation is less than 10 kgf/cm$^2$, the coating rubber is too soft and does not produce a cooperating action with steel cords and consequently the strain at the cord end portion largely appears to reduce the resistance to separation failure at, for example, the belt end, while when the modulus at 50% elongation exceeds 40 kgf/cm$^2$, the durability of cords in the belt is degraded or the cord-breaking-up is apt to be caused, and also the workability considerably lowers.

As inspected from the following examples, the enhancement of the durable life in the radial tire reinforced with the steel cord according to the invention is conspicuous.

EXAMPLE 1

Eight test tires according to the invention were provided by applying to the carcass ply steel cords each obtained by twisting plural steel filaments each having such a fine pearlite structure that the average interlamellar distance between cementites is within a range of 300-500 Å and the average sectional area of single pearlite crystal grain in filament section is not more than 20 $\mu m^2$, together with three control tires having substantially the same construction as the test tire except that the steel filament constituting the steel cord does not satisfy either one of the above defined average interlamellar distance and average sectional area or both, and then measured with respect to the degree of corrosion fatigue resistance.

In these tires, the twisting construction of the steel cord was the same and natural rubber having a modulus at 50% elongation of 24 kgf/cm$^2$ was used as a coating rubber. The corrosion fatigue resistance was evaluated by sealing 300 cc of water in a space between an inner liner and a tube during the mounting of the tire onto a rim and then measuring a durable life until the occurrence of CBU failure by a drum test under the following conditions:

Tire size: 1000 R 20 14 PR
Cord construction: 3+9×0.23 mm$\phi$+1
Running speed of drum: 60 km/hr
Internal pressure: 8 kgf/cm$^2$
Loading: JIS 100% load The obtained result as an index of tire durable life is shown togehter with C content, reduction of area, interlamellar distance between cementites, average sectional area of pearlite crystal grain and tensile strength in the steel filament in the following Table 1.

TABLE 1

| | Tire No. | Control tire | | | Test tire | | | | | | | |
|---|---|---|---|---|---|---|---|---|---|---|---|---|
| | | 1 | 2 | 3 | 4 | 5 | 6 | 7 | 8 | 9 | 10 | 11 |
| Steel filament | C content (%) | 0.73 | ← | ← | ← | ← | ← | ← | ← | 0.73 | ← | 0.84 |
| | Reduction of area (%) | 95.6 | ← | ← | ← | ← | ← | ← | ← | 97.0 | ← | 95.6 |
| | Interlamellar distance between cementites (Å) | 240 | 330 | 260 | 350 | 320 | 340 | 420 | 430 | 380 | 390 | 400 |
| | Average sectional area of pearlite | 28 | 26 | 14 | 7 | 12 | 18 | 6 | 18 | 8 | 17 | 7 |

TABLE 1-continued

| Tire No. | Control tire | | | Test tire | | | | | | | |
|---|---|---|---|---|---|---|---|---|---|---|---|
| | 1 | 2 | 3 | 4 | 5 | 6 | 7 | 8 | 9 | 10 | 11 |
| crystal grain (μm²) | | | | | | | | | | | |
| Tensile strength (kgf/mm²) | 292 | 274 | 296 | 276 | 278 | 270 | 258 | 252 | 294 | 291 | 289 |
| Durable life of tire (index) | 100 | 150 | 110 | 240 | 190 | 180 | 290 | 270 | 230 | 210 | 210 |

As apparent from Table 1, the durable life of the tire is considerably enhanced according to the invention. In general, when the interlamellar distance between cementites is made wider, if the steel material and the reduction of area are the same, the tensile strength usually reduces by about 20–50 kgf/mm². If such a reduction of the tensile strength comes into question in the use of the tire, it is necessary to increase the C content or the reduction of area for the purpose of solving this problem. According to the invention, the sufficiently improved performance can be retained even in the case of causing the above problem as shown in Table 1.

In table 1, the value of interlamellar distance between cementites $h_f$ is obtained by changing the patenting temperature of the steel filament prior to the drawing, while the value of sectional area of pearlite crystal grain is obtained by changing the furnace temperature and retention time in solution heat treatment.

The steel cord used in the control tire No. 1 of Table 1 is substantially the same as usually used in the prior art and is produced under the following conditions:

| Patenting treatment | |
|---|---|
| transformation temperature | 580° C. |
| transformation time | 15 seconds |
| Solution heat treatment | |
| average furnace temperature | 1,180° C. |
| retention time | 15 seconds |

According to the invention, the interlamellar distance in the pearlite structure of the steel filament of 300–500 Å is obtained by changing the transformation temperature and time of the conventional patenting treatment to 630°–680° C. and 18–25 seconds, respectively, while the sectional area of pearlite crystal grain of not more than 20 μm² is obtained by changing the furnace temperature and retention time of the conventional solution heat treatment to 950°–1,100° C. and 15–25 seconds, respectively. The steel filaments obtained under the above conditions are used in the manufacture of steel cord for use in the test tire Nos. 4–11.

Particularly, the steel filament used in the manufacture of steel cord of the tire No. 7 showing the greatest effect is produced under the following conditions:

| Patenting treatment | |
|---|---|
| transformation temperature | 670° C. |
| transformation time | 22 seconds |
| Solution heat treatment | |
| average furnace temperature | 1,020° C. |
| retention time | 20 seconds |

Moreover, the steel filament used in the control tire No. 2 is produced by the conventional method except that only the patenting treatment is carried out under the aforementioned conditions according to the invention, while the steel filament used in the control tire No. 3 is produced by the conventional method except that only the solution heat treatment is carried out under the aforementioned conditions according to the invention.

The interlamellar distance $h_f$ between cementites was confirmed by means of a 100 KV transmitting-type electron microscope and represented as an average of 100 measured values. Furthermore, the sectional area of the pearlite crystal grain was measured by taking three photographs per one sample at such a magnification that about 20–30 grains are existent in a visual field by means of a scanning-type electron microscope, accurately measuring the number of crystal grains in the photograph and then calculating an area of one grain from the area of the visual field, and represented as an average of the values obtained from the three photographs. In this case, the crystal grain cut at the edge of the photograph was counted as a half grain.

In order to reveal the crystal grains, a 1% nital solution ($HNO_3 + C_2H_5OH$) was used as an etching solution.

EXAMPLE 2

Five test tires according to the invention were provided by applying to the outermost layer of the belt steel cords each obtained by twisting plural steel filaments each having such a fine pearlite structure that the average interlamellar distance between cementites is within a range of 300–500 Å and the average sectional area of single pearlite crystal grain in filament section is not more than 20 μm², and then tested with respect to the corrosion fatigue resistance.

The corrosion fatigue resistance evaluated by running the tire on bad road conditions over a distance of about 50,000 Km and thereafter measuring the breaking number of cords in the belt. The cord breaking was produced from cracks based on the corrosion fatigue due to water penetrating through the damaged tread. The better the corrosion fatigue resistance, the greater the reduction of the cord breaking number.

Concerning the resistance to cord-breaking-up, the tire after the running was randomly divided into four parts, from one of which was peeled off the tread rubber to expose the outermost belt layer and then the cord breaking number was counted, from which an index of resistance to cord-breaking-up was calculated by the following equation:

$$\frac{\text{Cord breaking number of Control tire No. 12}}{\text{Cord breaking number of test tire}} \times 100$$

In the tires used in this test, the tire size was 1000 R 20, and high elongation cord having a cord construction of 4×4×0.23 mmφ was used as the steel cord, and natural rubber having a modulus at 50% elongation of 31 kgf/cm² was used as the coating rubber.

TABLE 2

| Tire No. | Control tire | | | Test tire | | | | |
|---|---|---|---|---|---|---|---|---|
| | 12 | 13 | 14 | 15 | 16 | 17 | 18 | 19 |
| Interlamellar | 240 | 330 | 260 | 350 | 320 | 340 | 420 | 430 |

TABLE 2-continued

| Tire No. | Control tire ||| Test tire |||||
|---|---|---|---|---|---|---|---|---|
| | 12 | 13 | 14 | 15 | 16 | 17 | 18 | 19 |
| distance between cementites (Å) | | | | | | | | |
| Average sectional area of pearlite crystal grain (μm²) | 28 | 26 | 14 | 7 | 12 | 18 | 6 | 18 |
| Tensile strength (kgf/mm²) | 292 | 274 | 296 | 276 | 278 | 270 | 258 | 252 |
| Resistance to cord-breaking-up (index) | 100 | 140 | 110 | 190 | 170 | 160 | 250 | 230 |

Note
In all of the tires used, the steel filament has a C content of 0.73% and a reduction of area of 95.6%. The steel cords of Tire Nos. 12-18 correspond to those of Tire Nos. 1-8 in Example 1.

As apparent from Table 2, the resistance to cord-breaking-up is largely improved according to the invention.

As mentioned herein, according to the invention, the durable life of the tire reinforced with steel cord can be considerably improved by rationalizing interlamellar distance between cementites and average sectional area of pearlite crystal grain in the pearlite structure of steel filament constituting the steel cord and simultaneously maintaining a predetermined tensile strength of the steel filament.

What is claimed is:

1. A high-durable pneumatic radial tire comprising a tread portion, a pair of side portions extending from the tread portion, a pair of bead portions extending from the side portions, and a carcass reinforced with a belt embedded in the tread portion, in which steel cords are used in at least one of the carcass and the belt, characterized in that said steel cord is produced by twisting plural steel filaments each having a tensile strength of not less than 220 kgf/mm², whose metallic structure being a fine pearlite structure having an average value of interlamellar distance between cementites of 300–500 Å and an average sectional area of single pearlite crystal grain in filament section of not more than 20 μm².

2. A high-durable pneumatic radial tire according to claim 1, wherein said steel cords used in at least one of the carcass and the belt is covered with a coating rubber having a modulus at 50% elongation of 10–40 kgf/cm².

* * * * *